Oct. 1, 1957     H. ZIEBOLZ     2,808,067
DETECTION AIR RECEIVING STRUCTURE
Filed Aug. 22, 1955
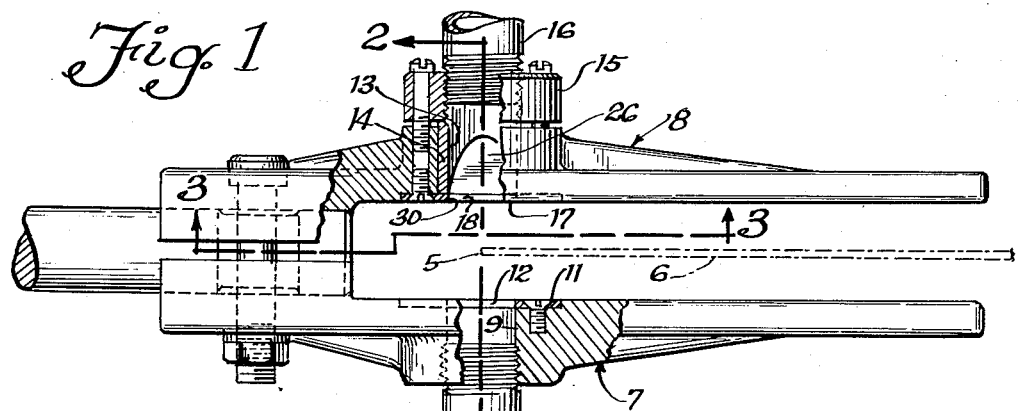
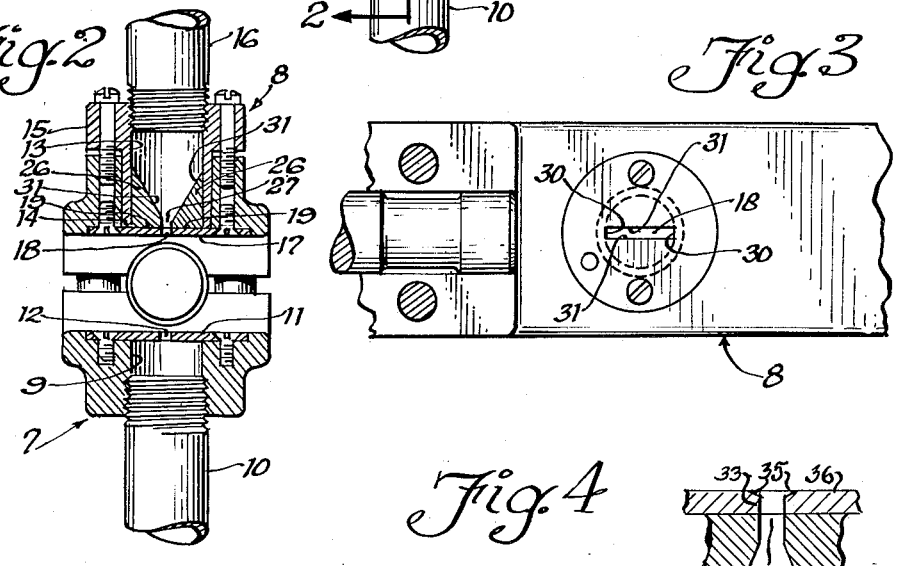
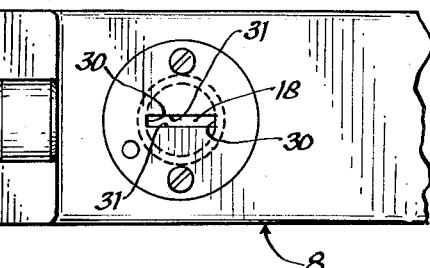
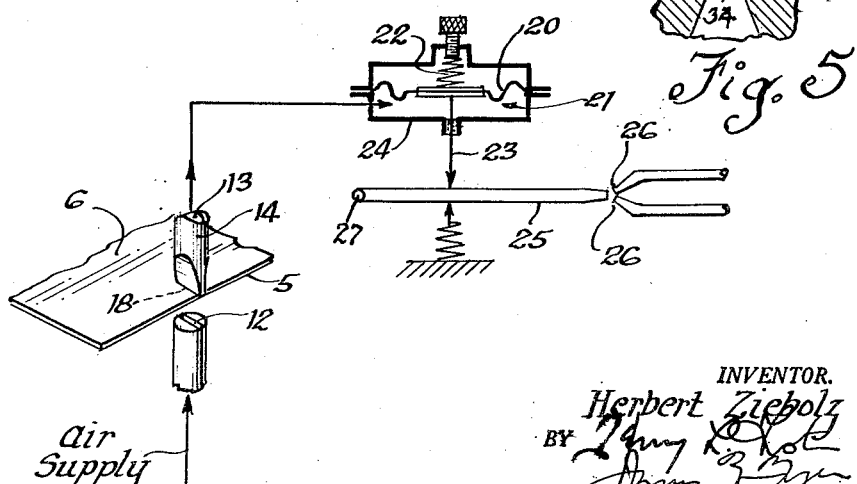
INVENTOR.
Herbert Ziebolz
BY
Att'ys.

2,808,067
DETECTION AIR RECEIVING STRUCTURE

Herbert Ziebolz, Chicago, Ill., assignor to Askania Regulator Company, Chicago, Ill., a corporation of Illinois Application August 22, 1955, Serial No. 529,738

4 Claims. (Cl. 137—83)

The present invention relates to detectors for sensing the lateral position of an edge of a body, such as a web, and developing a fluid signal pressure of a magnitude that corresponds to that position, and that is developed by interception by the marginal portion of the body adjacent the sensed edge of more or less of the cross section of a stream of fluid directed toward and past the region of location of the web, and toward a port opening from a chamber enclosed by a receiver wherein the signal pressure is developed. In such edge position sensing systems the signal pressure is effective in an expansible motor that is in closed communication with the receiver chamber, and the movable wall of which changes in position in response to changes in the signal pressure.

Heretofore, it has been usual for a receiver intended for the service in question to comprise a body structure with the internal pressure chamber in the form of a cylindrical bore through the structure, with a transverse plate across the receiving end and pierced by the receiver port, and a cylindrical signal pipe coupling inserted in the opposite end of the bore. Such an arrangement is convenient because it is easily manufactured, provides simple pipe coupling, and ready selection of a particular port size and shape.

The present invention is directed specifically to the problem, presented in many situations as where the sensed body is textile, paper or other fabric that sheds lint or other particles that are subject to transportation by the fluid sensing stream. Such material tends to be carried to the port, and may accumulate across it externally, or may be carried into the chamber and either lodge across the port internally or accumulate elsewhere in the signal pressure system to the deteriment of the satisfactory operation thereof.

While a pressure-responsive signal system of the kind usually employed for translating and usefully employing the variable pressure signal developed by a receiver of the kind in question usually is a closed system, it has certain operating characteristics that permit lint and other loose, fine debris to be carried through the receiver port and into the receiver chamber, or to lodge in or across the outer surfaces surrounding the port, and any such material readily may accumulate to an extent that will result in material impairment of sensitivity and/or accuracy of response of the detecting system. One such operating characteristic arises from changes in volume of the receiver-signal system due to movement of the movable wall of the expansible chamber motor device that is used to translate the signal pressure to a force or position usable to actuate control relay equipment, which results in recurrent periods of opposite air flows through the receiver port. Another factor of these recurrent, opposite air flows is changes in pressure and air density within the receiver-signal system. Still another characteristic of such devices accounting for a continuous circulating flow through the receiver port, is entry of air through the portion of the port that is exposed to the air stream, and the emergence of air through the portion of the port that is masked by the body the lateral position of the edge of which is being detected and indicated by the pressure developed in the receiver chamber. These various considerations explain the entry of air into the receiver chamber and the tendency of airborne solid material to be carried to the vicinity of the external opening of the receiver port, and to actually be carried into the port and receiver chamber.

For purposes of maintaining a desirable proportional relationship between distance of lateral shifting of the body edge, the position of which is being sensed, and the magnitude of pressure developed in the receiver chamber, it has become the practice to provide the orifice that delivers the sensing jet, and the port of the receiver, in the form of slots of relatively great lengths and relatively small widths, with their lengths disposed transverse to the edge being sensed. The structure overlying the end of the conveniently cylindrical receiver chamber, as the plate mentioned above, and provided with an elongate slot the cross dimension or width of which is very much less than the corresponding cross dimension, as the diameter, of the receiver chamber, presents internal flat surfaces, extending laterally and at right angles from the inner margins of the edge surfaces defining the port slot sides. The corners between the slot side-defining surfaces and these internal flat surfaces, and the latter surfaces themselves, provide pockets that are ideally arranged for both mechanical trapping of air-borne material, and for causing eddies in air flowing in either direction through the port opening, and so tend to collect such material, and permit it to accumulate to degrees that result in obstruction of the port and impairment of sensitivity and response accuracy of the receiver.

The present invention is based on the concept of elimination from the receiver chamber-, and port-defining surfaces, of all pockets, shoulder surfaces and corners that are of configurations tending to mechanically trap air-borne material, or to form eddies in air flowing in either direction through the receiver port. Thus the receiver chamber and port surfaces not only tend to maintain air borne material entrained in the air carrying it, but also are of configurations tending to cause air flowing outward through the port, as occurs in the case of diminishing signal pressure, to blow out any deposited material in the port and chamber.

The invention provides a structure that retains the practical advantages of the cylindrical bore and port plate receiver assembly, but that is arranged, so far as is possible, to reduce the tendency of loose particles to enter the receiver chamber, and to provide the chamber with an internal configuration that causes it to be self-clearing of material that does enter it.

In the accompanying drawings:

Fig. 1 is a side elevation of an edge detector assembly, embodying the invention and partly broken to show its novel internal arrangement.

Fig. 2 is a transverse section on line 2—2 of Fig. 1.

Fig. 3 is a partial section on line 3—3 of Fig. 1.

Fig. 4 is a schematic, disclosing a pressure signal system including a detector arranged according to the invention.

Fig. 5 is a fragmentary, enlarged section, showing a refinement of the invention.

Describing the drawings in detail, a detector for sensing the position of an edge 5 of a body 6 comprises support structure including a nozzle-providing portion 7 and a receiver structure 8. The nozzle of portion 7 is shown as a cylindrical bore 9 through portion 7, having a fluid supply pipe 10 secured in its rear end and a transverse plate 11 provided with a discharge orifice 12 positioned across its front end.

As is conventional in receivers of the kind in question, structure 8 has through it a cylindrical bore 13, here shown as provided in a sleeve 14 having a flange 15 for bolting to structure 8. A signal pressure-transmitting pipe 16 is coupled into the rear end of bore 13, and a plate 17 having receiver port 18 is mounted transverse to the bore and across its front end.

Assuming that body 6 is movable in directions extended transverse to its edge 5, the position of which is to be sensed, discharge orifice 12 and receiver port 18 may be in the form of narrow, elongate slots with lengths disposed in the directions of edge movement, since such configuration tends to give a linear response of pressure variation to edge position change in a substantial range of the latter. In any event, in the conventional structure, it is usual for the receiver port as defined by plate 17 to be smaller in at least one cross dimension than the pressure chamber-providing receiver bore 13. This leads to the existence of flat internal surfaces of plate 17, extended between the edges of the receiver port and corresponding surface portions of the structure enclosing bore 13, as at 19 in Fig. 2.

Referring to Fig. 4, which shows a typical edge-detecting system, air is discharged in a stream from orifice 12, toward the region of location of the edge 5, and such part of the stream as is not intercepted by the marginal portion of body 6 adjacent edge 5, impinges upon receiver port 18 and develops in the chamber provided by bore 13 a pressure the magnitude of which depends on the portion of the stream reaching the port and therefore on the position of edge 5. This signal pressure is transmitted, as by pipe 16 of Fig. 1, to an expansible chamber signal motor, shown in Fig. 4 as a flexible diaphragm 20 partly enclosing the signal pressure chamber 21, which is connected in communication with receiver chamber 13 as by pipe 16 of Figs. 1 and 2. A setting return spring 22 opposes the pressure in chamber 21, and the position of diaphragm 20 is transmitted by a rod 23 that extends through a seal in the casing 24. This position may be imposed on the control element of a relay regulator, such being indicated in Fig. 4 by the jet pipe 25, which is arranged to proportion delivery of oil under pressure to two receiver ports 26, for development of proportional pressures in the latter, according to the angular position of the jet pipe about its pivot axis 27.

In accordance with the invention, the internal surfaces defining the receiver chamber are so arranged as to avoid provision of shoulders or corners between surfaces in relative angular relationships tending to produce mechanical trapping of air-borne material, and/or tending to set up eddies in air currents flowing through receiver port 18, or circulating in the receiver chamber. Additionally, and as suggested by Fig. 5, the transverse cross section of the receiver port slot itself may be formed to attain the same objects.

In its broadest aspect, the structure embodying the invention is arranged to provide, in the chamber region adjacent the receiver port, surfaces that meet the inner margins of the edge surfaces defining the port sides at angles sufficiently obtuse to be productive of smooth and regular flow of air through that region. This is accomplished by providing the region of the receiver chamber adjacent the receiver port with a throat the walls of which converge to the inner margins of the port at the desirable obtuse angles mentioned above, and that continuously diverge away from the port to meet the chamber-defining wall surfaces of bore 13 at similar obtuse angles.

According to the specific disclosed form of the invention, this throat is provided by insert structure 26 mounted in the receiver chamber 13 and having internal surface forming the throat or passage 27, of which the smaller end is registered with and conforms in size and shape to the area of the port 18 provided in plate 17.

As indicated, the invention contemplates elimination from chamber 13 of shoulder surfaces disposed to provide lodgement for such material as may enter it or that may form eddies in air flows. To this end, the throat defining walls are provided with smooth surfaces extended from bore wall portions that are spaced laterally outward from corresponding portions of the edges of the receiver port, and that are spaced rearward along bore 13 from the inner surfaces of plate 17, and that are inclined inward and forward to meet with the corresponding port edge portions. In the drawings, receiver port 18 is shown as extending lengthwise between opposite, narrow surface portions of bore 13, so that its end edges 30 lie flush with portions of the bore surface, while the lateral edges 31 of the port are spaced substantially inward from corresponding portions of the bore periphery, insert structure 26 is shown as having plane, inclined surfaces 31 providing a tapered end zone or throat in chamber 13, and preventing exposure of the shoulder-providing portions 19 of plate 17 within chamber 13.

In the arrangement shown, material that may be carried into chamber 13 during expansion of motor chamber 21, or by circulation of the sensing fluid, into the exposed and out of the masked portion of the slot-like port 18, will fail to find lodgement and the absence of eddies will maintain such material in suspension. Circulating fluid will tend to carry such material from the chamber, and, in case of changes in system volume, material carried in during increasing pressure and system expansion, will tend to be ejected by outflowing fluid during subsequent diminution of pressure and contraction of the system.

In Fig. 5, the outer marginal portions of the plate edges 33 defining the slot-like receiver port 34 are chamfered at 35, to eliminate right angular corners between the outer plate surface 36 and the port defining edge surfaces of the plate. This tends to eliminate air eddies in the regions overlying plate surface 36 immediately surrounding the port, and in the region within port 34 immediately adjacent surface 36, and has been found to very materially reduce tendency of air-borne trash material to deposit in these regions.

From the foregoing, the principles and concepts upon which the invention herein disclosed is based will be apparent and it will be understood that many variations from the detailed exemplary forms thereof described may be resorted to within the invention, as set forth in the appended claims.

I claim:

1. In an edge position detector for sensing the lateral position of an edge of a body and developing a signal pressure of magnitude corresponding to that position, and including a nozzle having an orifice for discharging a stream of fluid under pressure toward the location of said edge, and a receiver having a port spaced to the opposite side of said orifice and positioned to receive fluid discharged by the latter, whereby magnitude of pressure developed by said stream in said port may be determined by the position of said body edge between said orifice and port; the improvement comprising structure of said receiver providing a passage for connection of a signal pressure pipe communicating with said port, having a diameter larger than a cross dimension of said port, and having lateral surface portions that are spaced outward from margins defining corresponding edges of said port, and insert means in said passage provided with continuous surfaces extended between said passage lateral surface portions at locations spaced along said passage from said port and inclined inward toward and meeting the margins of said corresponding port-defining edges at obtuse angles to said edges.

2. In an edge position detector for sensing the lateral position of an edge of a body and developing a signal pressure of magnitude corresponding to that position, and including nozzle means having an orifice for discharging a stream of fluid toward the region of location of said edge; a receiver for receiving the fluid discharge by said orifice that passes said body edge and developing a pressure of magnitude proportional to the percentage of fluid so passing that edge, said receiver comprising structure having therein a passage opposed to said orifice and having a cross dimension substantially larger than the corresponding cross dimension of said orifice, a plate mounted across said passage and provided with a port opposed to said orifice and having a cross dimension corresponding to said orifice and passage cross dimensions and substantially smaller than the latter, whereby lateral surface portions of said passage are spaced laterally outward from corresponding edges of said port, and insert means in said passage adjacent said plate and having inclined, smooth surfaces extended from said passage surface portions spaced along said passages from said plate and inward and meeting the inner margins of said corresponding port edges.

3. In an edge position detector for sensing the lateral position of an edge of a body and developing a signal pressure of magnitude corresponding to that position, and including nozzle means having an orifice for discharging a stream of fluid toward the region of location of said edge; a receiver for receiving the fluid discharged by said orifice that passes said body edge and developing a pressure of magnitude proportional to the percentage of fluid so passing that edge, said receiver comprising structure having therein a passage opposed to said orifice and having a cross dimension substantially larger than the corresponding cross dimension of the orifice, a plate mounted across said passage and provided with a port opposed to said orifice and having a cross dimension corresponding to said corresponding orifice and passage cross dimensions and substantially smaller than the latter, and insert means in said passage adjacent and contacting said plate, and having surfaces defining a throat having an opening of the same shape and size as and registered with said port, and said throat being extended inward from the latter and having a second opening corresponding in cross section and opening into said passage at a location rearwardly spaced from said port.

4. In an edge position detector for sensing the lateral position of an edge of a body and developing a signal pressure of magnitude corresponding to that position, and including nozzle means having an orifice for discharging a stream of fluid toward the region of location of said edge; a receiver for receiving the fluid discharged by said orifice that passes said body edge and developing a pressure of magnitude proportional to percentage of fluid so passing that edge, said receiver comprising structure having therein a passage opposed to said orifice and having a cross dimension substantially larger than the corresponding cross dimension of said orifice, a plate mounted across said passage and provided with a port opposed to said orifice and having a cross dimension corresponding to said orifice and passage cross dimensions and substantiailly smaller than the latter, and insert means in said passage adjacent and contacting said plate, and having surfaces defining a throat having an opening of the same shape and size as, registered with said port, and extended along said passage and inclined outwardly from said opening and having a second opening spaced rearward from, corresponding in cross section to, and opening into said passage.

References Cited in the file of this patent

UNITED STATES PATENTS

| | | |
|---|---|---|
| 1,978,502 | Moller | Oct. 30, 1934 |
| 2,397,448 | Todd | Mar. 26, 1946 |
| 2,539,131 | Gundersen | Jan. 23, 1951 |
| 2,672,150 | Benedict | Mar. 16, 1954 |